United States Patent Office.

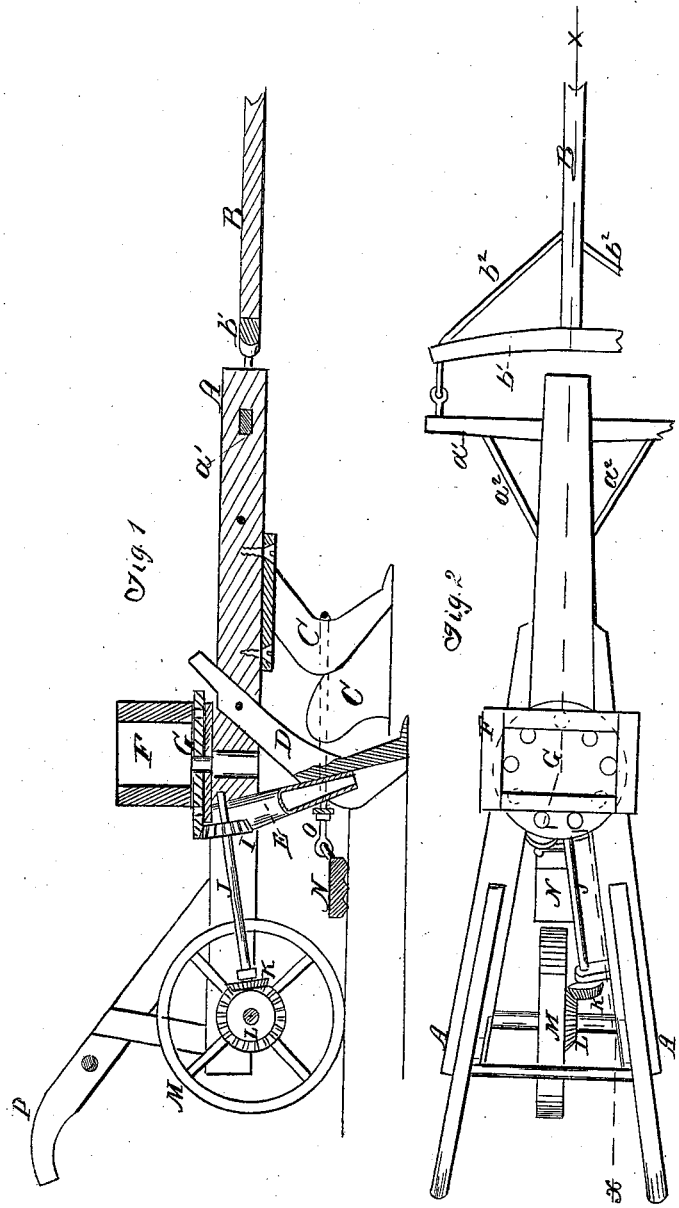

PETER SHELLENBERGER, OF MILLERSTOWN, PENNSYLVANIA.

Letters Patent No. 93,237, dated August 3, 1869.

IMPROVEMENT IN CORN-PLANTERS.

The Schedule referred to in these Letters Patent and making part of the same.

*To all whom it may concern:*

Be it known that I, PETER SHELLENBERGER, of Millerstown, in the county of Perry, and State of Pennsylvania, have invented a new and improved Corn-Planter; and I do hereby declare that the following is a full, clear, and exact description thereof, which will enable others skilled in the art to make and use the same, reference being had to the accompanying drawing, forming part of this specification, in which—

Figure 1 is a detail sectional view of my improved corn-planter, taken through the line $x$–$x$, fig. 2.

Figure 2 is a top view of the same.

Similar letters of reference indicate corresponding parts.

My invention has for its object to furnish an improved corn-planter, which shall be so constructed and arranged as to plant the corn at a uniform depth; and It consists in the construction and combination of various parts of the machine, as hereinafter more fully described.

A is the frame of the cultivator, to the forward part or beam of which is attached a cross-bar, $a^1$, which is strengthened by braces $a^2$.

B is the tongue, to the rear end of which is attached a cross-bar, $b^1$, the ends of which are connected with the ends of the cross-bar $a^1$ by links or jointed rods, as shown in fig. 2.

The cross-bar $b^1$ is strengthened by braces $b^2$, as shown in fig. 2.

This construction and arrangement of the tongue give the horses complete control over the machine.

C is a double mould-board plow, the upper end of the standard of which is attached to the forward part of the frame A, as shown in fig. 1.

The plow C is designed to open a furrow for the following plow D, which opens a furrow to receive the seed, and which runs at a greater depth than the plow C.

The upper part of the standard of the plow D is inclined forward, to leave more room for the spout E, that conducts the seed to the bottom of the furrow, where it is covered by the falling in of the earth in the rear of the plow D.

The upper end of the spout E is attached to the frame A, in such a position as to receive the seed, and conduct it to the ground.

F is the seed-box, which is attached to the middle part of the frame A, and in the bottom of which revolves a plate, G, having a circle of holes formed in it, each hole being of such a size as to contain the amount of seed desired to be dropped at once.

The dropping-plate G is pivoted, at its central point, to the frame A, and beneath it is placed a stationary plate, H, which forms a bottom to the holes through the plate G, and prevents the seed from dropping out, except at the rear of the seed-box F, where a part of the plate H is cut away, allowing the seed to drop into the spout E.

Upon the lower side of the dropping-plate G are formed gear-teeth, into which mesh the teeth of the small gear-wheel I, attached to the shaft J.

The shaft J revolves in bearings formed in or attached to the frame A, and to its rear end is attached a small bevel-gear wheel K, the teeth of which mesh into the teeth of the bevel-gear wheel L, formed upon or attached to the wheel M, the journals of which revolve in bearings in the rear part of the frame A.

The wheel M is made of such a size as to roll upon the ground, so that the corn may be dropped by the advance of the machine, the wheel M, at the same time, serving as a roller, to press down the soil upon the seed.

The seed is partially covered by the falling in of the soil in the rear of the plow D, and the covering is completed by the drag N, which is jointed or hinged, at its forward end, to the link, long clevis, or bow O, which passes around the standards of the plows C and D, so that the drag N may be drawn from the standard of the plow C.

P are the handles, which are attached to the rear part of the frame A, in the ordinary manner.

By this construction, the furrow is partially opened, and clods, stones, &c., moved out of the way by the plow C. The opening of the furrow is completed to a uniform depth by the plow D, and the seed is partially covered by the falling in of the soil in the rear of the said plow D. The covering is completed, and the ground smoothed off, by the drag N, and rolled by the wheel M, which also marks the position of the row, and serves as a guide in planting the next row.

Having thus described my invention,

What I claim as new, and desire to secure by Letters Patent, is—

The combination of the plows C D, constructed as described, and drag N O, with the frame A, spout E, dropping-device F G H I J K L, and wheel M, substantially as herein shown and described, and for the purpose set forth.

PETER SHELLENBERGER.

Witnesses:
   C. HEISEY,
   PETER × DURBERT.
        his mark.